US008397060B2

(12) United States Patent
Asokan et al.

(10) Patent No.: US 8,397,060 B2
(45) Date of Patent: Mar. 12, 2013

(54) REQUESTING DIGITAL CERTIFICATES

(75) Inventors: Nadarajah Asokan, Espoo (FI); Philip Ginzboorg, Espoo (FI); Valterri Nieml, Helsinki (FI)

(73) Assignee: Nokia Corporation, Espoo (FI)

( * ) Notice: Subject to any disclaimer, the term of this patent is extended or adjusted under 35 U.S.C. 154(b) by 832 days.

(21) Appl. No.: 10/504,192

(22) PCT Filed: Feb. 22, 2002

(86) PCT No.: PCT/IB02/02033
§ 371 (c)(1),
(2), (4) Date: Sep. 7, 2004

(87) PCT Pub. No.: WO03/071734
PCT Pub. Date: Aug. 28, 2003

(65) Prior Publication Data
US 2005/0086467 A1    Apr. 21, 2005

(51) Int. Cl.
*H04L 29/06* (2006.01)
(52) U.S. Cl. ........ 713/156; 713/155; 713/159; 713/173; 380/285; 726/20
(58) Field of Classification Search .................. 713/155, 713/156, 159, 173; 380/285, 28; 726/20, 726/30
See application file for complete search history.

(56) References Cited

U.S. PATENT DOCUMENTS

| 5,745,574 | A | 4/1998 | Muftic ........................... 380/23 |
| 6,940,979 | B1* | 9/2005 | Bobbitt ......................... 380/277 |
| 7,107,248 | B1 | 9/2006 | Asokan et al. |
| 7,110,986 | B1* | 9/2006 | Zajkowski et al. ............. 705/64 |
| 7,114,175 | B2* | 9/2006 | Lahteenmaki .................... 726/4 |

FOREIGN PATENT DOCUMENTS

| WO | WO 01/46922 A2 | 6/2001 |
| WO | WO 02/05075 A2 | 1/2002 |

OTHER PUBLICATIONS

Meyers et al., Certificate Management Messages Over CMS, Network Working Group, Request for Comments 2797, Apr. 2000.*
S. Jacobs: "Mobile IP Public Key Based Authentication", IETF Internet Draft, Mar. 1999, pp. 1-28.*
RSA Laboratories, PKCS #10 v1.7: Certification Request Syntax Standard, May 26, 2000.
Meyers et al., "Internet X.509 Certificate Request Message Format", Network Working Group, RFC 2511, Mar. 1999.

* cited by examiner

*Primary Examiner* — Matthew Smithers
*Assistant Examiner* — Paul Callahan
(74) *Attorney, Agent, or Firm* — Mintz, Levin, Cohn, Ferris, Glovsky & Popeo, P.C.

(57) ABSTRACT

A method for requesting a certificate from a certificate issuer for a public key that is associated with a corresponding private key stored by a storing entity, the method comprising: generating by means of a generating entity a certificate request message indicative of a request for a certificate; and transmitting the certificate request message to the certificate issuer; the certificate request message including an indication of the relationship between the storing entity and the generating entity.

31 Claims, 4 Drawing Sheets

REQUESTING DIGITAL CERTIFICATES

This invention relates to the requesting and issuing of digital certificates.

It is becoming increasingly common for transactions to be carried out by electronic means. In financial transactions, and in many other transactions, there is a need to establish a level of trust between the parties to the transaction. For example, if a purchaser wishes to buy goods on-line then the supplier of the goods must be satisfied that the purchaser will provide payment for the goods. The purchaser may also want to be satisfied that his payment is indeed to be transferred to the supplier.

One means for such trust to be established is by a public/private key system. In such a system each user has a pair of keys. One key is a public key, which can be made available to other users. The other key is a private key, which is held secret by the user whose key it is. The public and private keys are related by algorithms such that, whilst it is extremely difficult to generate the private key from knowledge of the public key, the private key and public key can be used for digital signing. In digital signing a first algorithm is applied by a user to his private key and source data, to form result data; then the result data is transmitted to another user. The other user applies a second algorithm to the first user's public key, the result data, and, depending on the signature scheme, other input, to form verification data. The public and private key and the first and second algorithms are related such that the verification data indicates to high level of probability whether the first user's private key was used to generate the result data. Provided the first user's private key is secret to him, and that the second user can trust that the public key really belongs to the first user, this authenticates the first user to a high level of probability. An example of such a system is the Pretty Good Privacy (PGP) public/private key system.

A digital certificate is normally used to bind an identity of a subject to a public key. Certificates are themselves signed statements issued by a certification authority. If a user has the authority's public key, he can verify certificates issued by that authority.

If one user (verifier) has access to a certificate issued for the public key of another user (signer) by an authority trusted by the verifier, then the verifier can really trust that the public key belongs to the signer. This type of certificate is known as an identity certificate. Identity certificates are not sufficient for transactions requiring authorization. For example, in the case of an online purchase, the seller may want to verify not just the identity of the purchaser but also that the purchaser has the money to pay for the purchase. In addition, the certificate issuing party typically has legal and business responsibilities concerning how its certificates are used. For these reasons each certificate normally contains parameters that define how that certificate should be used. Examples of those parameters are the purpose for which the certificate has been issued, certificate expiration time and the limit on the amount of money allowed in a single transaction using the certificate. Certificates may relate to a single transaction or may be used to authorize a number of transactions each within a value limit specified in the certificate.

During the issuing of a digital certificate over a network connection, at least two messages must be exchanged between the requesting and the issuing parties. Those two messages are the certification request sent by the requesting party and a corresponding reply sent by the issuing party. There are standards for the issuing procedure, e.g. PKCS10 by RSA (see especially PKCS #10, v1.7: Certification Request Syntax Standard, RSA Laboratories, May 26, 2000) and RFC 2511 [CRMF] by the IETF pkix working group (Internet X.509 Certificate Request Message Format, RFC 2511).

Certificate issuing over a network can be secured in a number of ways. For example, Nokia's United States patent application "System and method of bootstrapping a temporary public-key infrastructure from a cellular telecommunication authentication and billing infrastructure," U.S. Ser. No. 09/659,781, Sep. 11, 2000 (and corresponding applications) describes a system in which the security of the certificate request and reply messages is based on a secret known by both mobile terminal and the cellular network. In general, certificate request may be secured by attaching an authenticator field to it, which may be e.g. a message authentication code computed using a shared secret, or a digital signature computed using a private key different from the one whose public key is being certified.

The following is an example of an authenticator field computed using shared secret. In the Universal Mobile Telecommunications System (UMTS) the USIM (Universal Subscriber Identity Module) computes a session integrity key IK during the authentication and key agreement process between the phone (user equipment) and the cellular network. The USIM may be in the form of a smart card. The USIM exports the IK to the phone software, which uses the IK to protect the integrity of all signaling messages. In the case of UMTS subscriber certificates, the UMTS integrity key (IK) can be used to authenticate the certificate request, as discussed in U.S. application Ser. No. 09/659,781 referenced above. One way to do this would be to individually protect all certificate requests and replies by means of the IK. Another way would be to send all certificate requests and replies as signaling messages, because in UMTS (for example) the signaling plane is automatically IK protected.

The following is an example of authenticator in the form of digital signatures. The smart card is manufactured such that it contains a management key pair before it leaves the factory. The manufacturer knows the management public key of each card. When the user gets the card he can trigger the card to generate a new key pair. This new key pair could be used for example, to generate and later verify signatures for authorizing transactions. The user can get a certificate from the manufacturer for the new public key. Such a certificate is normally called a device certificate. The device certificate is a guarantee of quality of key pair (specifically that the keys were generated using correct algorithms and the private key is in a secure location). The authenticator for this certificate request will be a digital signature made using the management private key.

When a user uses a device such as a laptop, mobile phone or Personal Digital Assistant (PDA) to request a certificate for a public key, that public key may originate from the device from which the request is made or from another device.

It is desirable that in addition to checking the entitlement of the user making the request, the certificate issuer should also take into account provenance of the key pair, so as to inhibit fraud. For example, in order for the certificate issuer to protect himself and the owner of the key from potential fraud it may be desirable for the certificate issuer to refuse to issue a certificate in response to a request if the public key specified by the request originates from another device than that which has made the request However, present certificate issuing standards and other publicly available descriptions of certificate issuing do not take account of the origin of the public key to allow this to be done.

According to one aspect of the present invention there is provided a method for requesting a digital certificate from a digital certificate issuer for a public key that is associated with a corresponding private key stored by a storing entity, the method comprising: generating by means of a generating entity a certificate request message indicative of a request for a certificate; and transmitting the certificate request message to the digital certificate issuer; the certificate request message including an indication of the relationship between the storing entity and the generating entity.

According to a second aspect of the present invention there is provided generating entity for generating a certificate request message for requesting a digital certificate from a digital certificate issuer for a public key that is associated with a corresponding private key stored by a storing entity, the generating entity being arranged to generate the certificate request message including an indication of the relationship between the storing entity and the generating entity.

According to a third aspect of the present invention there is provided digital certificate issuer for processing certificate request messages, the digital certificate issuer being arranged to analyze the request message to determine whether it is an acceptable request; and if the request is determined to be acceptable, issuing a digital certificate in response to the request, and being arranged to limit the digital certificate in dependence on the indication of the relationship included in the certificate request message.

According to a fourth aspect of the present invention there is provided communication system comprising such a generating entity and such a digital certificate issuer.

Preferably the indication is of a physical relationship between the storing entity and the generating entity. Alternatively, or in addition, the indication may be of a security relationship between the storing entity and the generating entity.

Preferably the indication can take one of a predetermined set of forms. One of the forms may indicate that the storing entity is physically comprised in the generating entity and the storing entity is physically secure, for example tamper-resistant. One of the forms may indicate that the storing entity is physically comprised in the generating entity and the storing entity is not physically secure. One of the forms may indicate that the storing entity is not physically comprised in the generating entity. One of the forms may indicate that the public key has been provided to the generating entity by user input. The generating entity is preferably arranged to determine the relationship between it and the storing entity and to provide the indication in accordance with the result of that determination.

Preferably the digital certificate issuer: analyzes the request message to determine whether it is an acceptable request; and if the request is determined to be acceptable, issues a digital certificate in response to the request.

The certificate request message preferably comprises data that is a function of the private key, whereby the certificate request message may be authenticated by the digital certificate issuer. The digital certificate issuer may authenticate the request message by means of the public key or by means of a shared symmetric key, which may also be stored by a store associated with the digital certificate issuer.

Preferably the digital certificate issuer is arranged to limit the digital certificate to a predetermined level if the request message is not authenticated. That level may be nil, in which case it could be that no certificate is issued.

Preferably the digital certificate issuer is arranged to limit the digital certificate in dependence on the indication of the relationship included in the certificate request message. The digital certificate issuer may store a plurality of usage levels, one corresponding to each available value of the indication of the relationship, and may apply those levels as limits on the certificate that can be issued in response to a request in accordance with the indication in the message.

The limitation of the certificate is preferably a limitation of the capabilities or intended usage of the certificate. The indication of the relationship between the storing item and the generating item of equipment inside the certificate request may influence the decision on what kind of certificate the issuer will produce. The indication itself may be left out of the issued certificate, or it may be recorded explicitly inside the certificate, in which case it is visible to the entity who handles the certificate.

The generating entity may be an item of user equipment (UI) of a cellular communications network, for example a UMTS mobile phone. The storing entity may be a Universal integrated Circuit Card (UICC) or Wireless Identity Module (WIM) installed in the item of user equipment, for example in the form of a smart card. The generating entity and the storing entity may be the same, for example they may be both in a smart card.

The certificate issuer may be part of the cellular communications network, or may be external to the cellular network. The network may, for example be a GSM (Global System for Mobile Communications) network, or its successor, a 3G (third generation) network, or a derivative thereof.

The present invention will now be described by way of example with reference to the accompanying drawings.
In the drawings.

In the present system, devices in a communication network can request from a certificate issuer certificates for use in authentication and authorization aspects of transactions. Each certificate is requested and issued in respect of a public key for which there is a corresponding private key. The requesting of a certificate is performed according to a method in which the request for the certificate includes an indication of the origin or provenance of the key in respect of which a certificate is requested.

Figure 1:
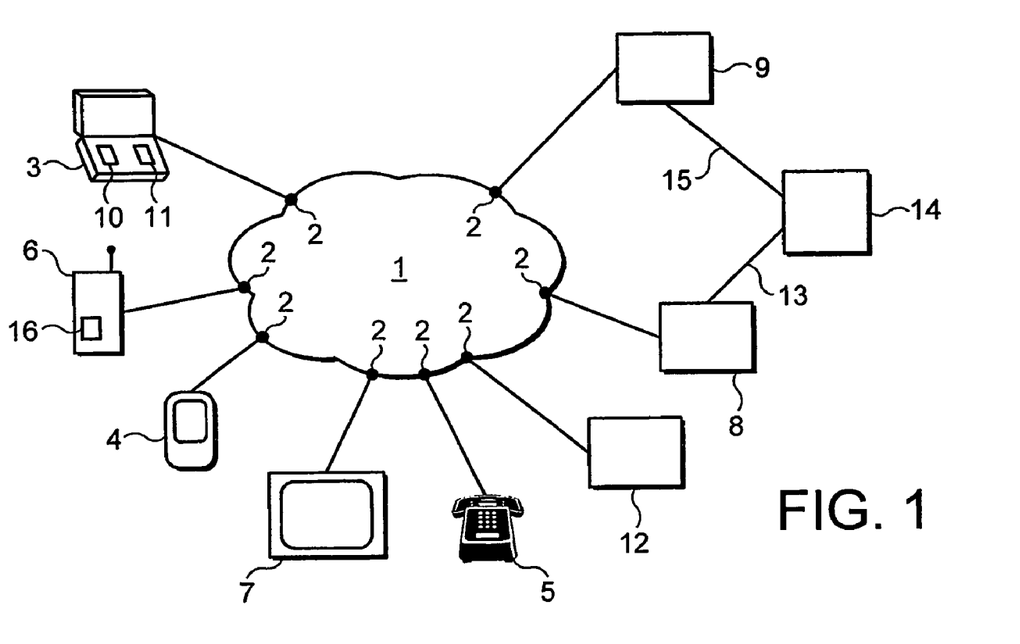
FIG. 1 illustrates the architecture of a communication system.

FIG. 1 shows a communication system. The system includes a switching and data transfer network shown generally at 1. This could include one or more telephone networks and the internet. A number of access points 2 are provided by means of which devices can access the network 1. These access points could (without limitation) be wireless base stations, wired network access points etc. The devices could be any network capable devices such as laptop computer 3, PDA 4, land-line phone 5, mobile phone 6 or television with interactive multimedia capabilities 7. The devices can communicate over the network 1. The devices can communicate with a certificate issuer 8 and a transaction server 9 over the network 1, and normally the devices may be able to communicate with each other over the network.

At least some of the devices have associated public/private key pairs. Such devices store their private key secretly, but can make the public key available to other devices for encryption and authentication purposes. At least some of the devices are capable of supporting applications that can request certificates in respect of a public key. For example, laptop 3 includes a memory 10 (such as a hard disc drive) which stores public and private keys associated with the laptop. Memory 10 also stores software that is capable of requesting and using a certificate, as will be described in more detail below. The laptop includes processing means (suitably at least one processor 11 with associated memory) for executing the software. The software is preferably arranged to inhibit transmission of the private key out of the device.

When a device such as laptop 3 is to request a certificate for a public key it transmits a request message over network 1 to the certificate issuer 8. That message includes an indication of the public key for which the certificate is requested. If the network includes a public key directory 12, which stores a list of user or device identifiers and associated public keys, then the message may include an identifier associated with the public key and the certificate issuer may then, if necessary, retrieve the associated public key from the directory by means of a look-up performed on the identifier. Alternatively, the request message may include the public key itself. On receiving the request message the certificate issuer performs a verification process, which is described in more detail below, and if appropriate issues a certificate. In the case of a certificate for authorizing a financial transaction the certificate may be associated with a monetary amount that limits the value for which the certificate is to be relied upon in a single transaction.

In addition to certificate request authenticator described earlier the certificate request may also be authenticated by means of the private key that is associated with the public key for which the request is made. This can only be done if that private key is available to the device forming the request. This method is called proof-of-possession.

In the present system the request message includes a parameter that indicates the relationship between:
(a) the unit that has initiated the request, normally the unit where the request is generated, (this will be referred to as the "A unit"); and
(b) the unit associated with the public key for which the certificate is requested, normally the unit that stores the associated private key, (this will be referred to as the "B unit").

This parameter may be referred to as a provenance or Key_origin parameter. Some non-limiting examples of the relationships that may be indicated by the Key_origin parameter are:
1. that the B unit is a specific security element or module inside the A unit, e.g. Universal Integrated Circuit Card (UICC) inside the UMTS phone;
2. that the B unit is a security element or module incorporated in the A unit;
3. that the B unit is non-secured internal memory of the A unit;
4. that the B unit is a device external to the A unit; and
5. that the public key has been identified directly from user input.

In general, the Key_origin parameter indicates the degree of the requesting equipment's knowledge of how well the private key is protected. For example, if the Key_origin parameter has values 1 or 2 above then it can reasonably be assumed that the private key is in a secure location.

Some examples of the use of the Key_origin parameter will now be given.

Figure 3:
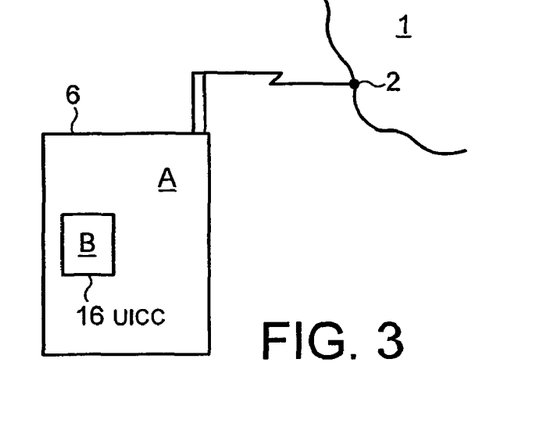
FIGS. 3 to 6 illustrate examples of equipment implementing aspects of the present invention.

In FIG. 3 reference numeral 6 designates a mobile phone terminal or user equipment (UE) device. The UE includes a security element or module 16, in the form of a specific secured smart card, for instance in a UICC 16. If the UE requests a certificate in respect of a public key whose associated private key is stored in the UICC 16 then such a request would be expected to have a high degree of trust since the UE can be expected to permit only secure access to or use of the private key. In this case Key_origin value 1 indicated above would be used.

Figure 4:
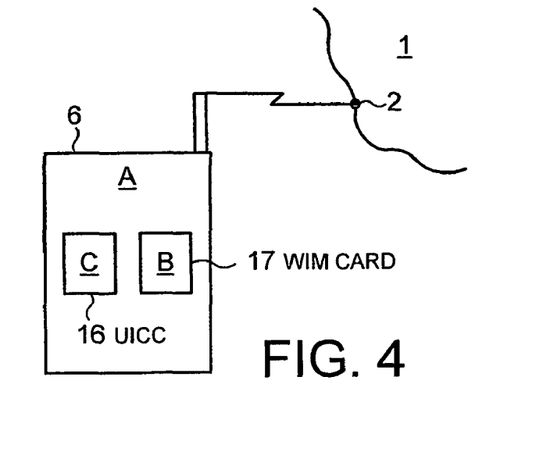

In FIG. 4, the UE 6 includes a element or module 17, such as a wireless identity module (WIM), which is not specifically known to the certificate issuer, but is still asserted to be a secure element or module by the UE 6. In this case Key_origin value 2 indicated above would be used.

Figure 5:
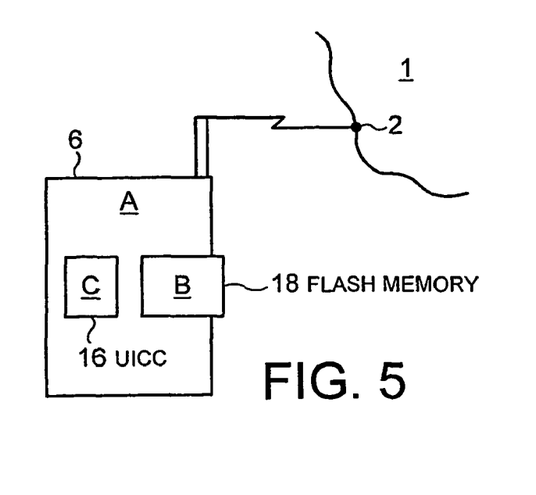

In FIG. 5, the UE 6 includes a storage element or module 18, such as a flash memory module where the private key is stored. This is not a secure location and the keys may be vulnerable to theft or modification by a virus program, or someone who steals the device. In this case Key_origin value 3 indicated above would be used, so that the certificate issuer can limit the risk by restricting the capabilities granted to the public key in the certificate.

Figure 6:
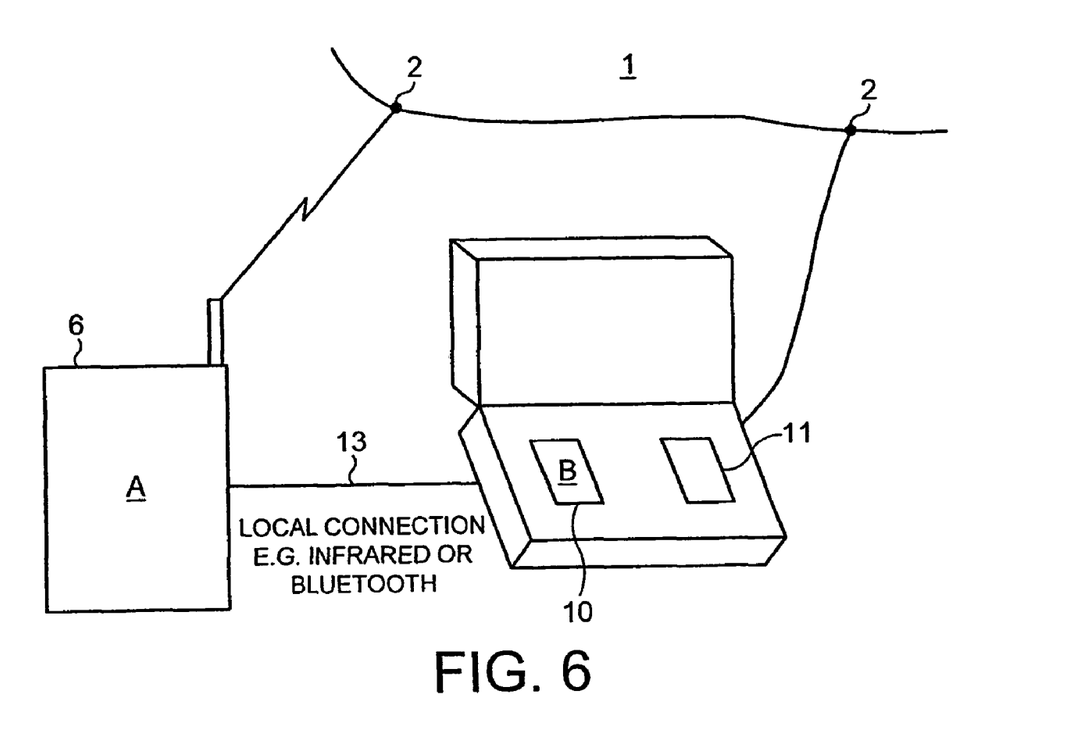

In FIG. 6, the laptop 3 and the UE 6 could belong to the same user, who may wish to use UE 6 to request a certificate for transactions using the public key of the laptop 3. The laptop 3 and the UE 6 communicate using a local communication link 19, such as an infrared or Bluetooth communication link. For example, the link 19 may be used to transfer the public key from laptop 3 to UE 6 or the certificate back from UE 6 to the laptop 3. In that case Key_origin value 4 indicated above would be used. Although in this instance the same user has control of laptop 3 and UE 6 this cannot be ensured; further, because the private key is in an external location whose security cannot be known, it may be vulnerable to theft so the use of the Key_origin value 4 can help to reduce risk (e.g. the risk that certificates can be requested by one device for transactions that are not associated with that device or its user) by limiting the capabilities granted to the public key in the certificate.

The present invention could advantageously be implemented in a 3G (third generation) mobile telecommunications system or a derivative thereof.

Now we describe one example in which the Key_origin and the digital certificate are used. The certificate issuer may set limits on the value associated with a certificate, in dependence on the Key_origin parameter specified in the request for the certificate. For example, the issuer may authorize certificates for values of up to 42 EUR if Key_origin value 1 above, values of up to 1 EUR if Key_origin value 3 above, and with a certificate that authorizes access to a certain service but no monetary transactions if Key_origin is value 5 above. The limits may be applied globally to all certificate issuing, or different limits may be allowed for different users or classes of users.

In addition the certificate issuer may be connected to a financial server 14, for example at a bank, by a secure data link 13. When a certificate is to be issued to a user for a certain value, the certificate issuer can reserve that value in funds from the user's account at the bank by communicating over the link 13. When the user uses the certificate in a transaction, for example to buy goods, the funds can be transferred to the account of the beneficiary of the transaction. The beneficiary may initiate this transfer over another secure link 15 to the financial server. If the certificate expires or is cancelled without having been used for a transaction then the certificate issuer can return the reserved funds to the account.

Figure 2:
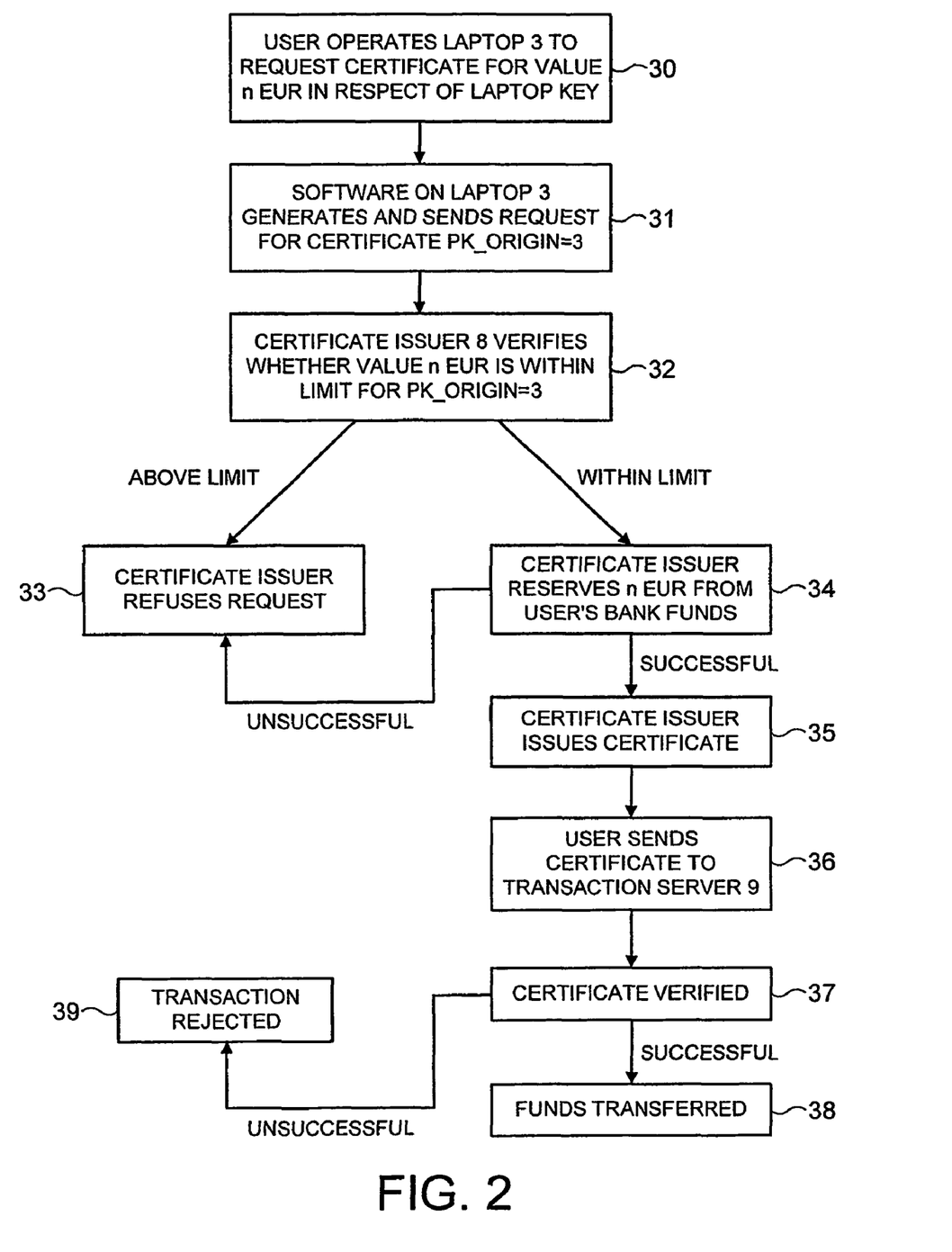
FIG. 2 illustrates a method for issuing a digital certificate.

FIG. 2 illustrates the procedure of a procedure for requesting, issuing and using a certificate in the example as described above.

In the procedure of FIG. 2, a user causes a request to be transmitted from laptop 3 to certificate issuer 8 for a certificate in respect of a value of n EUR. The request includes a public key associated with a private key that is stored on the hard disc drive 10 of the laptop, or indicates the identity of the laptop/user so that the certificate issuer can retrieve the relevant public key from directory 12. As indicated above, the value of Key_origin is set to 3. (Steps 30 and 31).

If the request has been signed then the signature is verified at the certificate issuer, and if such verification is unsuccessful the request is refused. The signature is preferably done by means of the private key that corresponds to the public key for which the certificate has been issued. Depending on the signing algorithm that has been used, the verification may be done by means of the associated public key, or by means of the private key itself if it is known to the certificate issuer. If the request has not been signed then the certificate issuer may limit the value of potential transactions done using a resulting certificate to a predetermined level, for example by assuming the Key_origin field to have the value associated with the lowest degree of trust. Another way of securing the request is to use a shared secret between the terminal and the network and a communication channel which is secured by the shared secret, by using e.g. message authentication codes.

The certificate issuer checks in step 32 whether the requested value (n EUR) is within the limit set for certificates in response to the value of Key_origin as specified in the request. (Here, Key_origin=3). If it is above that limit then the request for a certificate is rejected. (Step 33).

If the requested amount is within the limit then the certificate issuer reserves n EUR of funds from the user's account. The identity of this account may be indicated in the request, or may be stored in a database such as directory 12. (Step 34). If the reservation of funds is unsuccessful then the request is rejected. The reservation of funds can alternatively be made by some other entity than the certificate issuer itself.

If the reservation is successful then the certificate is issued. (Step 35). Subsequently the user may transmit the certificate to another party with whom he wishes to carry out a transaction (e.g. the user of server 9), and that server may then verify the certificate with the certificate issuer 8. (Steps 36 and 37). If the verification is successful then the transaction can take place. (Step 38). Otherwise, for instance if the certificate has expired or has been revoked, the transaction is rejected. (Step 39).

It is preferred that the device that generates the request is pre-programmed to apply the correct Key_origin value to a request. The issuer may also be able to know what kind of device is creating the request in, for instance, a case where terminal capabilities are communicated to the network side. In the situation where the certificate issuer does not trust the requesting device to apply the correct value of Key_origin the certificate issuer may apply another predetermined limit to the value that can be certified, for example by assuming the Key_origin field to have the value associated with the lowest degree of trust.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and Without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method, comprising:
   requesting a certificate from a certificate issuer for a public key that is associated with a corresponding private key stored by a storing entity, the requesting comprising,
      generating a certificate request message indicative of a request for a certificate generated by a generating entity, and
      transmitting the certificate request message to the certificate issuer, wherein the certificate request message comprises an indication of an origin of at least one of the private key and the public key, the indication representative of whether at least one of the storing entity and the generating entity are secure and whether or not the storing entity and the generating entity are within a single device.

2. A method, comprising:
   requesting a certificate from a certificate issuer for a public key that is associated with a corresponding private key stored by a storing entity, the requesting comprising,
      generating a certificate request message indicative of a request for a certificate generated with a generating entity; and
      transmitting the certificate request message to the certificate issuer,
         wherein the certificate request message comprises an indication of a relationship between the storing entity and the generating entity, and
      wherein the indication is representative of whether at least one of the storing entity and generating entity are physically secure and whether or not the storing entity and the generating entity are within a single device.

3. The method as claimed in claim 2, wherein the indication is of a physical relationship between the storing entity configured to store the private key and the generating entity configured to generate the request.

4. The method as claimed in claim 2, wherein the indication is of a security relationship between a storing entity configured to store the private key and the generating entity configured to generate the request.

5. The method as claimed in claim 4, wherein the indication is of knowledge of the generating entity regarding a level of security of the private key stored by the storing entity.

6. The method as claimed in claim 2, wherein the indication comprises one of a predetermined set of forms, and one of the forms indicates that a storing entity configured to store the private key is physically comprised in a generating entity configured to generate the request and the storing entity is physically secure.

7. A method according to claim 2, wherein the indication indicates that the storing entity is not physically comprised in the generating entity.

8. A method according to claim 2, wherein the indication indicates that a public key has been provided to the generating entity by user input.

9. The method as claimed in claim 2, wherein the certificate issuer analyzes the request message to determine whether the certificate request message is an acceptable certificate request message and,
   when the certificate request message is determined to be acceptable, issues a certificate in response to the certificate request message.

10. The method as claimed in claim 9, wherein the certificate comprises an indication of the relationship between a storing entity configured to store the private key and a generating entity configured to generate a request.

11. The method as claimed in claim 9, wherein the certificate request message comprises data that is a function of a signing key, whereby the certificate request message is authenticated by the certificate issuer.

12. The method as claimed in claim 11, wherein the certificate issuer authenticates the request message using a verifying key.

13. The method as claimed in claim 11, wherein there is a symmetric key known both to the generating entity and to the certificate issuer, wherein the certificate issuer authenticates the request message using the shared symmetric key.

14. The method as claimed in claim 9, wherein the certificate issuer limits the certificate depending on the indication of the relationship in the certificate request message.

15. The method as claimed in claim 2, wherein the storing entity configured to store the private key is a smart card installed in an item of user equipment.

16. The method as claimed in claim 2, wherein the storing entity is a universal integrated circuit card installed in the item of user equipment.

17. An apparatus, comprising:
a generator configured to generate a certificate request message to request a certificate from a certificate issuer in respect of a public key that is associated with a corresponding private key stored by a storing entity, wherein the generator is configured to generate the certificate request message including an indication of an origin of at least one of the public key and the private key, the indication representative of whether at least one of the storing entity and the generating entity are physically secure and whether or not the storing entity and the generating entity are within a single device, the generator implemented on at least one processor that is comprised at least partially of hardware.

18. The apparatus of claim 17, wherein the indication is of a physical relationship between a storing entity configured to store the private key and a generating entity configured to generate the request.

19. The apparatus of claim 17, wherein the indication is of a security relationship between a storing entity configured to store the private key and a generating entity configured to generate the request.

20. An apparatus, comprising:
a certificate issuer configured to process certificate request messages, the certificate issuer configured to analyze a certificate request message to determine whether the certificate request message is an acceptable certificate request message, when the certificate request message is determined to be acceptable, issue a certificate in response to the certificate request message, and configured to limit the certificate based on an indication of an origin of at least one of a public key and a private key, the indication representative of a physical security determined based on a relationship of at least one of a generator and a storage entity storing the at least one of the public key and the private key, the indication further representative of whether or not the storing entity and the generating entity are within a single device, the certificate issuer implemented on at least one processor that is comprised at least partially of hardware.

21. The apparatus of claim 20, wherein the certificate comprises an indication of the relationship between a storing entity configured to store the private key and a generating entity configured to generate the request.

22. The apparatus of claim 20, wherein the certificate request message comprises data that is a function of a signing key, whereby the certificate request message is authenticated.

23. The apparatus of claim 22, further comprising:
an authenticator configured to authenticate the request message using a verifying key.

24. A method, comprising:
receiving a certificate request message from a generating entity for a public key that is associated with a corresponding private key stored by a storing entity, wherein the certificate request message comprises an indication of an origin of at least one of the public key and the private key;
analyzing the certificate request message to determine whether the certificate request message is acceptable; and
issuing a certificate in response to the certificate request message when the certificate request message is determined to be acceptable, the certificate being limited based on the indication of the origin of the at least one of the public key and the private key, the indication representative of whether at least one of the storing entity and the generating entity are physically secure and whether or not the storing entity and the generating entity are within a single device.

25. The method of claim 24, wherein the certificate comprises an indication of the relationship between a storing entity configured to store the private key and a generating entity configured to generate the request.

26. The method of claim 24, wherein the certificate request message comprises data that is a function of a signing key, whereby the certificate request message is authenticated.

27. The method of claim 26, further comprising:
authenticating the certificate request message using a verifying key.

28. A computer program embodied on a non-transitory computer-readable storage medium, the computer program configured to control a processor to perform operations comprising:
requesting a certificate from a certificate issuer from a generating entity for a public key that is associated with a corresponding private key stored by a storing entity, the requesting comprising generating a certificate request message indicative of a request for a certificate; and
transmitting the certificate request message to the certificate issuer, wherein the certificate request message comprises an indication of an origin of at least one of the public key and the private key the indication representative of whether at least one of the storage entity and the generating entity are physically secure and whether or not the storing entity and the generating entity are within a single device.

29. A computer program embodied on a non-transitory computer-readable storage medium, the computer program configured to control a processor to perform operations comprising:
receiving a certificate request message from a generating entity for a public key that is associated with a corresponding private key stored by a storing entity, wherein the certificate request message comprises an indication of an origin of at least one of the public key and the private key;
analyzing the certificate request message to determine whether the certificate request message is acceptable; and
issuing a certificate in response to the certificate request message when the certificate request message is determined to be acceptable, the certificate being limited based on the indication of the origin of the at least one of the public key and the private key in respect of the certificate which is requested, the indication representative of whether at least one of the storage entity and the generating entity are physically secure and whether or not the storing entity and the generating entity are within a single device.

30. An apparatus comprising:

a generator configured to generate a certificate request message to request a certificate from a certificate issuer in respect of a public key that is associated with a corresponding private key stored by a storing entity, wherein the generator is implemented on at least one processor that is comprised at least partially of hardware; wherein the generator is configured to generate a certificate request message comprising an indication of a relationship between the storing entity and the generator, wherein the indication indicates whether at least one of the storing entity and generating entity are physically secure and whether or not the storing entity and the generating entity are within a single device.

31. A computer program embodied on a non-transitory computer-readable storage medium, the computer program configured to control a processor to perform operations comprising:

requesting a certificate from a certificate issuer by a generating entity for a public key that is associated with a corresponding private key stored by a storing entity, the requesting comprising, generating a certificate request message indicative of a request for a certificate; and transmitting the certificate request message to the certificate issuer, wherein the certificate request message comprises an indication of a relationship between the storing entity and the generating entity, and wherein the indication indicates whether at least one of the storing entity and the generating entity are physically secure and whether or not the storing entity and the generating entity are within a single device.

\* \* \* \* \*